June 5, 1951  E. SOKOLIK  2,556,118
BODY LOWERING APPARATUS
Filed March 1, 1947
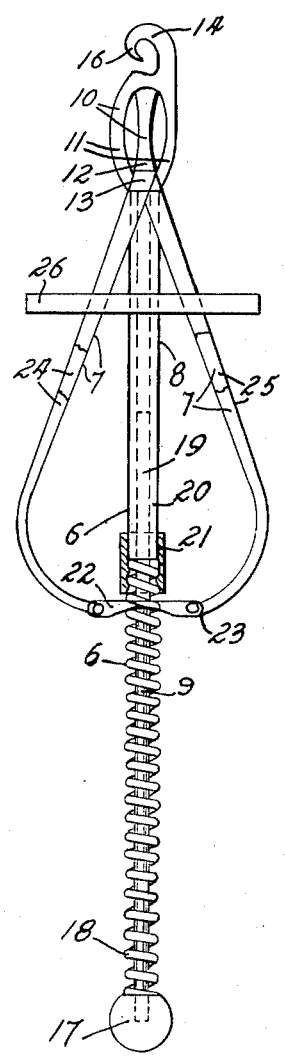
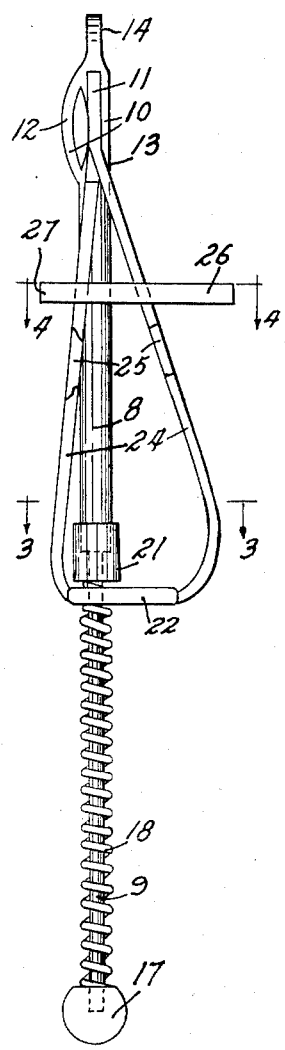
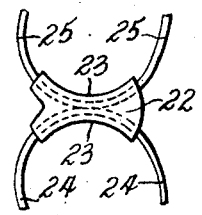
INVENTOR.
BY Edward Sokolik Patented June 5, 1951

2,556,118

UNITED STATES PATENT OFFICE 2,556,118

BODY LOWERING APPARATUS

Edward Sokolik, New Brighton, Minn.

Application March 1, 1947, Serial No. 731,879

3 Claims. (Cl. 227—49)

My present invention relates to supensory saddle tackling with means for detachably attaching same to the strand elements of a mechanical body lowering mechanism and for saddling and lowering fire escapees.

The principal object of this invention is to provide a saddle tackling that will lower a fire escapee safely, comfortably and shocklessly.

These and other objects and advantages will be apparent as the specification progresses.

In the drawings—

Figure 1 is an elevation with the coupling of the saddle tackling in section and Figure 2 is an elevation thereof at a quarter turn.

Fig. 3 illustrates the seat on line 3—3 of Fig. 2.

Fig. 4 illustrates the breast strap on line 4—4 Fig. 2.

Fig. 5 is a section of one form of a joint of the breast strap and the upright straps.

My saddle tackling comprises a pedestal 6 for absorbing the landing shock of the fire escapee and for carrying the sling 7 for an escapee.

The pedestal 6 includes a pair of telescopic members 8 and 9, each nominally three feet long. The upper member 8 is tubular and provided with a coupling and holding head 10 secured to the upper end thereof, preferably screw-threadedly. This head 10 is uprightly oblong consisting preferably of two upright laterally opposed holding members 11, one for each hand of the escapee to hold onto and a posteriorly disposed hand guard member 12 to shield the hands from wall obstructions in the descent of the escapee; preferably a screw-coupling 13, which is connected to the tubular member 8 and is integral with the holding members 11 and hand guard member 12; a safety hook 14 preferably integral with the holding members 11 and hand guard 12. The hook 14 is adapted for detachable connection to a connecting eye terminal of a cable or the like.

The lower member 9 is the male member, which may be solid or tubular, provided with a spherical deflector 17 to deflect the saddle tackling from window ledges and the like in descent; a shock absorbing coil spring 18 nominally a foot shorter than the member 9, encircling said member 9 leaving the end-portion 19 of the member 9 projecting therefrom. This end-portion 19 is telescoped into the bottom end-portion 20 of the tubular member 8 up to the coil spring 18. This coil spring 18, besides serving as a shock absorber, also serves as a coupler for the members 8 and 9 to limit the telescopic movement thereof without disconnecting and has the top end thereof secured to the member 8 preferably by a coupling 21 and the lower end thereof to the bottom of the member 9 or to the spherical deflector 17 thereof. These members 8 and 9, when assembled with the shock absorbing spring 18, affords a pedestal 6 of such length proportions as to permit the escapee to conveniently hold onto the coupling and holding head 10 and to walk therewith, the spherical deflector 17 clearing the floor.

The sling 7 is comprised of a seat 22, which is preferably recessed in the front edge thereof to partly straddle the pedestal 6 against which it rests, and adapted on each side edge 23 for securing thereto a pair of upright suspensory straps 24 and 25 or other means, which are secured to the head 10. Each pair of the two pairs of straps 24 and 25 are spaced apart at the lower ends thereof and converged at the upper ends thereof, thereby holding the seating 22 level and holding the descending escapee at his sides to prevent falling out of the escapee during descent. A chest strap 26 provided with the buckle 27 on one end thereof is secured to the two pairs of upright suspensory straps 24 and 25. The chest strap 26 may be passed thru a reenforcing as shown in Figure 5 and secured therein so that the strap 26 can be buckled around the chest at the armpits to safely hold the descending escapee in the saddle tackling.

What I claim is:

1. A suspensory saddle tackling for descending fire escapees comprising a combined shock absorbing suspensory pedestal and a fire escapee carrying sling attached to said pedestal, said pedestal including a pair of partially telescoped telescoping members having a combined length to permit an escapee saddled in said saddle tackling to walk therewithal or to hold thereonto during his descent, the top telescoping member being tubular and provided on the top end thereof with a safety hitching means combined with means for the escapee to hold onto during his descent, with means adapted to shield the hands holding onto the holding means from wall protuberances and with means from which to suspend the sling, the bottom telescoping member being provided at the bottom thereof with a generally spherical element adapted to deflect said bottom member from wall protuberances during descent thereof; a shock absorbing coil spring encircling the bottom member and yieldingly coacting with the telescoping members in absorbing the landing shock from the escapee, when shock is being transmitted from the saddle tackling to the shock absorbing coil spring; a coupling adaptably connecting the top end of the coil spring with the bottom end of the top member, said coil spring having the bottom end thereof secured to the bottom of the bottom telescoping member to prevent displacement of the telescoping members; said sling for saddling therein an escapee, depending from the suspending means and including a seat, two pairs of companion upright straps, each pair of said straps being attached, spaced apart, to each side edge of the seat and converging to the suspending means and being attached thereto; a chest strap provided on one end thereof with a buckle to buckle with the other end thereof, said strap being disposed in a horizontal plane and secured to each strap of the two pair of upright straps, said sling being adapted safely and comfortably to saddle an escapee therein during his descent.

2. A suspensory tackling for fire escapees, comprising a combined suspensory pedestal for absorbing the landing shock from a landing escapee and a sling suspending from the top of said pedestal and including a seat having two pairs of upright straps, each pair of straps attached to each side of the seat, said straps converging to the suspending means and being attached thereto; a chest strap provided with buckling means horizontally secured to each of the upright straps, said sling being adapted to comfortably saddle therein a fire escapee and to prevent said escapee from falling out therefrom in descent.

3. A suspension means for descending fire escapees, comprising a combined suspensory sling to comfortably saddle therein individual fire escapees and to prevent falling out of said individual escapees in descent and a pedestal for absorbing the landing shock from descended fire escapees including a pair of partially telescoped telescoping members having a combined length permitting an escapee saddled in said suspension means to walk therewithal or to hold thereonto during his descent, the top of the upper tubular member being provided with a combined safety hitching means and means for the escapee to hold onto during his descent, said holding means being adapted to shield the hands holding thereonto from wall protuberances, and adapted to support the sling; a generally spherical element provided at the bottom of the lower telescoping member and adapted to deflect the said member from wall protuberances during descent thereof; a coil spring encircling said lower member and yieldingly coacting with the telescoping members in absorbing the landing shock from the escapee, and the lower and upper members telescoping, when shock is transmitted from the suspension means to the coil spring; a coupling adaptably connecting the top end of the coil spring with the bottom end of the upper member, and the bottom end of said coil spring being secured to the bottom end of the lower member to prevent displacement of the partially telescoped telescoping members.

EDWARD SOKOLIK.

REFERENCES CITED

The following references are of record in the file of this patent:

UNITED STATES PATENTS

| Number | Name | Date |
|---|---|---|
| 148,744 | Parent | Mar. 17, 1874 |
| 291,001 | Powell | Dec. 25, 1883 |
| 637,626 | Lindeberg | Nov. 21, 1899 |
| 701,094 | Setbacken | May 27, 1902 |
| 772,056 | Ragsdale | Oct. 11, 1904 |
| 831,462 | Noyer | Sept. 18, 1906 |
| 1,428,369 | Giannone | Sept. 5, 1922 |
| 1,490,524 | Wood | Apr. 15, 1924 |

FOREIGN PATENTS

| Number | Country | Date |
|---|---|---|
| 532,133 | France | Nov. 9, 1921 |